(12) United States Patent
Straitiff et al.

(10) Patent No.: US 10,996,142 B2
(45) Date of Patent: May 4, 2021

(54) PNEUMATIC TIRE PRE-CONDITIONING SYSTEM AND METHOD

(71) Applicant: Android Industries LLC, Auburn Hills, MI (US)

(72) Inventors: Donald Graham Straitiff, Howell, MI (US); Lawrence J. Lawson, Troy, MI (US); Joshua James Hicks, Grand Blanc, MI (US); Christopher Michael Bulliner, Goodrich, MI (US); Anthony Willard Pierce, Owosso, MI (US); Kerry Verran, Davison, MI (US); Andrew Douglas Schmidt, Davisburg, MI (US)

(73) Assignee: Android Industries LLC, Auburn Hills, MI (US)

( * ) Notice: Subject to any disclaimer, the term of this patent is extended or adjusted under 35 U.S.C. 154(b) by 176 days.

(21) Appl. No.: 16/226,184

(22) Filed: Dec. 19, 2018

(65) Prior Publication Data
US 2019/0187028 A1 Jun. 20, 2019

Related U.S. Application Data

(60) Provisional application No. 62/608,357, filed on Dec. 20, 2017.

(51) Int. Cl.
*G01M 17/02* (2006.01)
*B60C 25/00* (2006.01)

(52) U.S. Cl.
CPC ......... *G01M 17/022* (2013.01); *B60C 25/002* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045;

(Continued)

(56) References Cited

U.S. PATENT DOCUMENTS 4,164,281 A 8/1979 Schnier
5,363,698 A * 11/1994 Poling, Sr. .......... G01M 17/022
73/146

(Continued)

FOREIGN PATENT DOCUMENTS

CN  105947527 A   9/2016
KR  101056527 B1  8/2011
WO  2017012684 A1 1/2017

OTHER PUBLICATIONS

International Search Report and Written Opinion of International Application No. PCT/US2018/066449 dated Apr. 3, 2019.

*Primary Examiner* — Andre J Allen
(74) *Attorney, Agent, or Firm* — Honigman LLP (57) ABSTRACT

A pneumatic tire pre-conditioning system includes a conveyor system, a belt assembly, a friction device and a drive system. The conveyor system includes a tire engaging surface, a first side, and a second side. The belt assembly is adjacent to the first side of the tire engaging surface. The friction device is adjacent to the second side of the tire engaging surface. The drive system is configured to move a tire along the tire engaging surface in a path between the belt assembly and the friction device.

21 Claims, 4 Drawing Sheets

(58) Field of Classification Search
CPC .......... G01M 1/12; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 5,915,611 A | 6/1999 | Baldoni et al. | |
| 8,678,066 B2 | 3/2014 | Mani et al. | |
| 2007/0062632 A1 | 3/2007 | Yarimizu et al. | |
| 2012/0138190 A1* | 6/2012 | Lawson | B25J 11/00 141/38 |
| 2014/0197012 A1* | 7/2014 | Miller | B65G 15/44 198/469.1 |
| 2014/0283590 A1* | 9/2014 | Sotgiu | B60C 25/0551 73/146 |
| 2014/0311231 A1* | 10/2014 | Braghiroli | G01M 17/021 73/146 |
| 2016/0368233 A1* | 12/2016 | Agawa | B41F 16/008 |

* cited by examiner

PNEUMATIC TIRE PRE-CONDITIONING SYSTEM AND METHOD

CROSS-REFERENCE TO RELATED APPLICATIONS

This U.S. patent application claims priority to U.S. Provisional Application 62/608,357 filed on Dec. 20, 2017 the disclosure of which is considered part of the disclosure of this application and is hereby incorporated by reference in its entirety.

TECHNICAL FIELD

The disclosure relates to a system and method for pre-conditioning a pneumatic tire.

BACKGROUND

It is well known in the industry that tires have inherent structural non-uniformities that if excessive, may cause objectionable vibrations in the vehicles onto which they are installed. There are dedicated industry standard machines that measure and quantify said tire non-uniformity. It has also been demonstrated that if mounted and dismounted carefully, a tire will often be more uniform following the mounting and dismounting process than it was prior to the process. It is believed that the uniformity improvement obtained in the process is brought about by the disruptions of micro adhesions within the tire which are formed during the tire manufacturing process.

DESCRIPTION OF THE DRAWINGS

The disclosure will now be described, by way of example, with reference to the accompanying drawings, in which.

SUMMARY

One aspect of the disclosure provides a pneumatic tire pre-conditioning system. In some configurations, the pneumatic tire pre-conditioning system includes a conveyor system, a belt assembly, a friction device and a drive system. The conveyor system includes a tire engaging surface that has a first side and a second side. The belt assembly is adjacent to the first side of the tire engaging surface. The friction device is adjacent to the second side of the tire engaging surface. The drive system is configured to move a tire along the tire engaging surface in a path between the belt assembly and the friction device. The distance between the belt assembly and the friction device is less than the outer diameter of the tire.

Implementations of the disclosure may include one or more of the following optional features. In some implementations, the conveyor system includes a continuous loop of a carrying medium. In some configurations, the conveyor system includes a plurality of rollers.

In some implementations, the belt assembly includes a first end, a second end, a first rotating device, a second rotating device and a belt. The first rotating device is adjacent to the first end and the second rotating device is adjacent to the second end. The belt is configured to engaged and at least partially surround both the first rotating device and the second rotating device. In some examples, the belt forms a continuous loop of a flexible material and the belt rotates around the first rotating device and the second rotating device. In some implementations, the belt assembly is unpowered and the friction device is stationary. In some implementations, the drive system includes a pin moving in synchronization with the conveyor system. The pin may be configured to engage an inner diameter of the tire.

Another aspect of the disclosure provides a pneumatic tire pre-conditioning method. The method includes compressing a tire between a first surface and a second surface such that the tire is deformed into a deflected shape. The method also includes moving at least one of the first surface, the second surface and the tire in a way that causes the tire to at least partially rotate about its rotational axis.

Implementations of this aspect of the disclosure may include one or more of the following optional features. In some implementations, the tire is at least partially deflected as it at least partially rotates about its rotational axis. In some examples, the method includes the step of presenting the tire to the first surface and the second surface by way of a conveyor. In some configurations, the method includes moving at least one of the first and the second surfaces in a plane that is generally parallel to the rotational axis of the tire.

Another aspect of the disclosure provides a method for operating a pneumatic tire pre-conditioning system. The method includes providing a conveyor system including a tire engaging surface having a first side and a second side. The method also includes providing an belt assembly adjacent to the first side of the tire engaging surface and a friction device adjacent to the second side of the tire engaging surface. The method further includes moving a tire along the tire engaging surface in a path between the belt assembly and the friction device, the distance between the belt assembly and the friction device is less than the outer diameter of the tire.

Implementations of this aspect of the disclosure may include one or more of the following optional features. In some implementations, the conveyor system includes a continuous loop of a carrying medium. In some configurations, the conveyor system includes a plurality of rollers.

In some implementations, the belt assembly includes a first end, a second end, a first rotating device, a second rotating device and a belt. The first rotating device is adjacent to the first end and the second rotating device is adjacent to the second end. The belt is configured to engaged and at least partially surround both the first rotating device and the second rotating device. In some examples, the belt rotates around the first rotating device and the second rotating device. In some implementations, the belt assembly is unpowered and the friction device is stationary.

The details of one or more implementations of the disclosure are set forth in the accompanying drawings and the description below. Other aspects, features and advantages will be apparent from the description and drawings, and from the claims.

DETAILED DESCRIPTION

The figures illustrate exemplary implementations of pneumatic tire pre-conditioning systems and methods. Based on the foregoing, it is to be generally understood that the nomenclature used herein is simply for convenience and the terms used to describe the various exemplary implementations of the pneumatic tire pre-conditioning systems and methods should be given the broadest meaning by one of ordinary skill in the art.

Prior to describing implementations of the pneumatic tire pre-conditioning systems and methods, reference is made to FIGS. 1A-1D, which illustrate an exemplary tire T. In the present disclosure, reference may be made to the "upper," "lower," "left," "right" and "side" of the tire T; although such nomenclature may be utilized to describe a particular portion or aspect of the tire T, such nomenclature may be adopted due to the orientation of the tire T with respect to structure that supports the tire T. Accordingly, the above nomenclature should not be utilized to limit the scope of the claimed systems and methods and is utilized herein for exemplary purposes in describing various implementations of the pneumatic tire pre-conditioning systems and methods.

In an embodiment, the tire T includes an upper sidewall $T_{SU}$ (see, e.g., FIG. 1A), a lower sidewall $T_{SL}$ (see, e.g., FIG. 1D) and a tread surface $T_T$ (see, e.g., FIGS. 1B-1C), that joins the upper sidewall $T_{SU}$ to the lower sidewall $T_{SL}$. Referring to FIG. 1B, the upper sidewall $T_{SU}$ may rise away from the tread surface $T_T$ to a peak and subsequently descend at a slope to terminate at and form a circumferential upper bead, $T_{BU}$; similarly, the lower sidewall $T_{SL}$ may rise away from the tread surface $T_T$ to a peak and subsequently descend at a slope to terminate at and form a circumferential lower bead $T_{BL}$.

As seen in FIG. 1B, when the tire T is in a relaxed, unbiased state, the upper bead $T_{BU}$ forms a circular, upper tire opening $T_{OU}$; similarly, when the tire T is in a relaxed, unbiased state, the lower bead $T_{BL}$ forms a circular, lower tire opening, $T_{OL}$. It will be appreciated that when an external force is applied to the tire T, the tire T may be physically manipulated, and, as a result, one or more of the upper tire opening $T_{OU}$ and the lower tire opening $T_{OL}$ may be temporality upset such that one or more of the upper tire opening $T_{OU}$ and the lower tire opening $T_{OL}$ is/are not entirely circular, but, may, for example, be manipulated to include an elliptical shape.

Figure 1A:
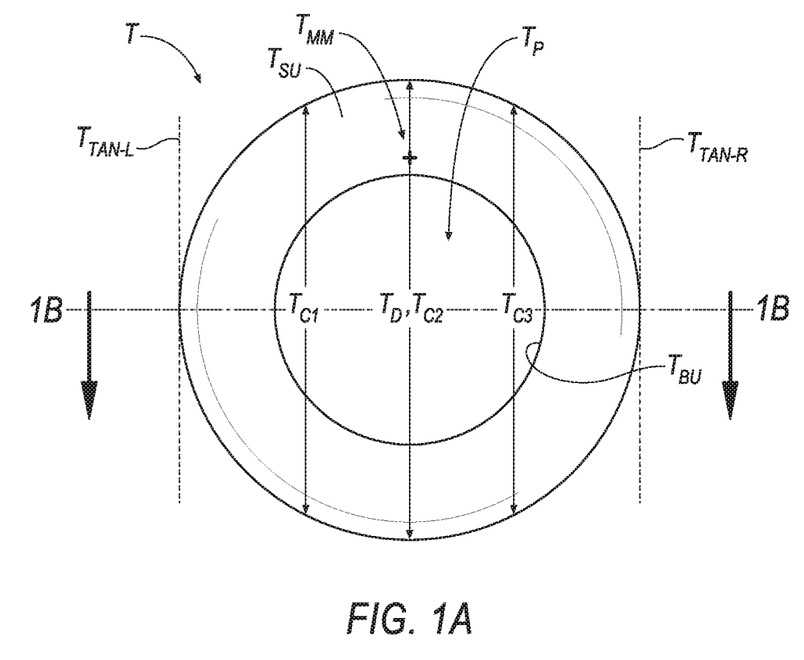
FIG. 1A is a top view of an exemplary tire.
Figure 1B:
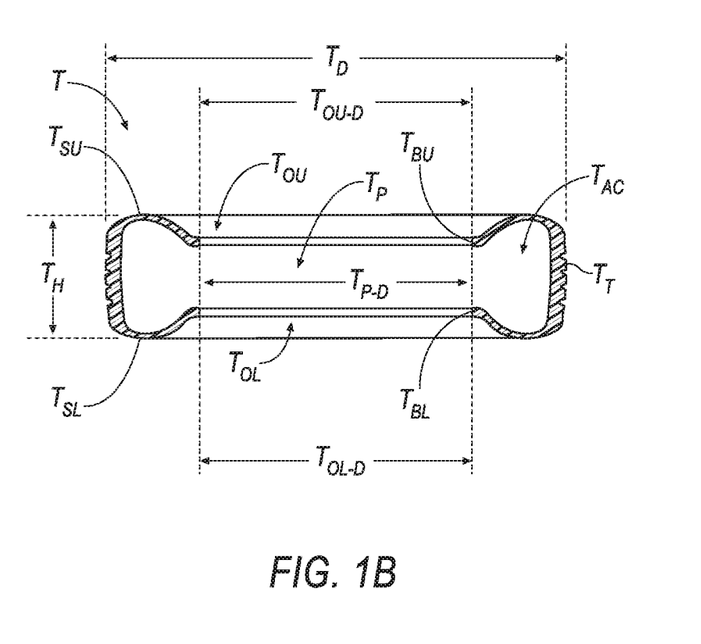
FIG. 1B is a cross-sectional view of the tire according to line 1B-1B of FIG. 1A.
Figure 1C:
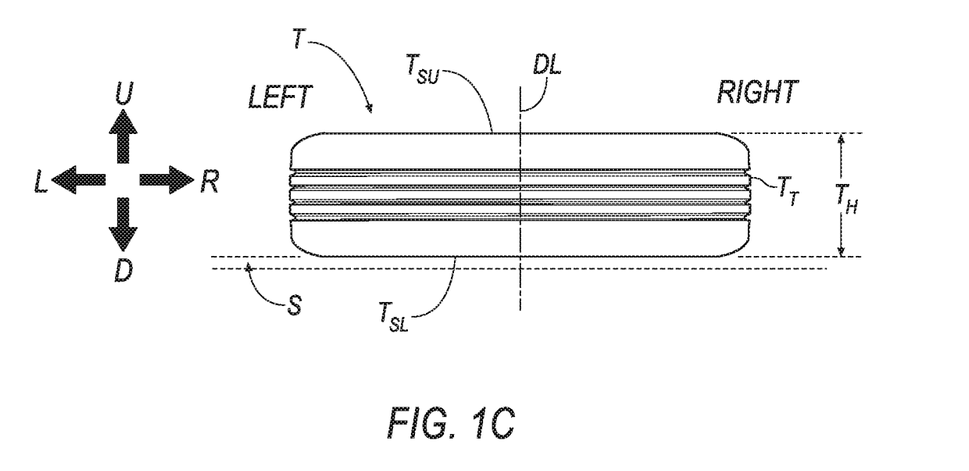
FIG. 1C is a side view of the tire of FIG. 1A.
Figure 1D:
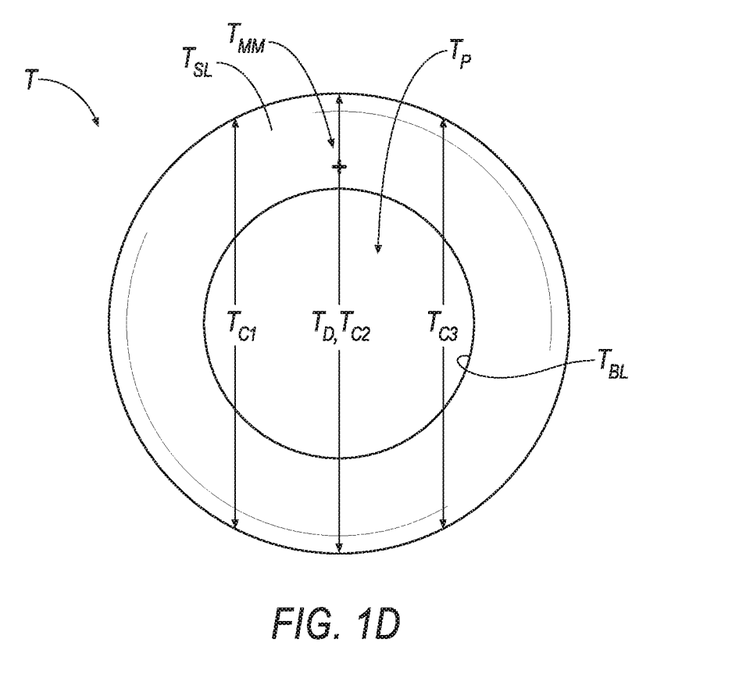
FIG. 1D is bottom view of the tire of FIG. 1A.

Referring to FIGS. 1A and 1D, when in the relaxed, unbiased state, each of the upper tire opening $T_{OU}$ and the lower tire opening $T_{OL}$ form, respectively, an upper tire opening diameter $T_{OU-D}$ and a lower tire opening diameter $T_{OL-D}$. Further, as seen in FIGS. 1A and 1D, when in the relaxed, unbiased state, the upper sidewall $T_{SU}$ and the lower sidewall $T_{SL}$ define the tire T to include a tire diameter $T_D$.

Referring to FIGS. 1A-1B and 1D, the tire T also includes a passage $T_P$. Access to the passage $T_P$ is permitted by either of the upper tire opening $T_{OU}$ and the lower tire opening $T_{OL}$. Referring to FIG. 1B, when the tire T is in a relaxed, unbiased state, the upper tire opening $T_{OU}$ and the lower tire opening $T_{OL}$ define the passage $T_P$ to include a diameter $T_{P-D}$. Referring also to FIG. 1B, the tire T includes a circumferential air cavity $T_{AC}$ that is in communication with the passage $T_P$.

Referring to FIG. 1C, the tire T is shown relative to a support member S; the support member S is provided (and shown in phantom) in order to establish a frame of reference for the "left" portion and the "right" portion of the tire T. In FIG. 1C, the tire T is arranged in a "non-rolling" orientation such that the tread surface $T_T$ is not disposed adjacent the phantom support member S but, rather, the lower sidewall $T_{SL}$ is disposed adjacent the phantom support member S. A center dividing line DL equally divides the "non-rolling" orientation of the tire T in half in order to generally indicate a "left" portion of the tire T and a "right" portion of the tire T.

As discussed above, reference is made to several diameters $T_{P-D}$, $T_{OU-D}$, $T_{OL-D}$ of the tire T. According to geometric theory, a diameter passes through the center of a circle, or, in the present disclosure, the axial center of the tire T, which may alternatively be referred to as an axis of rotation of the tire T. Geometric theory also includes the concept of a chord, which is a line segment that whose endpoints both lie on the circumference of a circle; according to geometric theory, a diameter is the longest chord of a circle.

In the following description, the tire T may be moved relative to structure; accordingly, in some instances, a chord of the tire T may be referenced in order to describe an implementation of the pneumatic tire pre-conditioning systems and methods. Referring to FIG. 1A, several chords of the tire T are shown generally at $T_{C1}$, $T_{C2}$ (i.e., the tire diameter, $T_D$) and $T_{C3}$.

The chord $T_{C1}$ may be referred to as a "left" tire chord. The chord $T_{C3}$ may be referred to as a "right" tire chord. The chord $T_{C2}$ may be equivalent to the tire diameter $T_D$ and be referred to as a "central" chord. Both of the left and right tire chords $T_{C1}$, $T_{C3}$, include a geometry that is less than central chord $T_{C2}$/tire diameter $T_D$.

In order to reference the location of the left chord $T_{C1}$ and the right chord $T_{C3}$ reference is made to a left tire tangent line $T_{TAN-L}$ and a right tire tangent line $T_{TAN-R}$. The left chord $T_{C1}$ is spaced apart approximately one-fourth (¼) of the tire diameter $T_D$ from the left tire tangent line $T_{TAN-L}$. The right chord $T_{C3}$ is spaced apart approximately one-fourth (¼) of the tire diameter $T_D$ from the right tire tangent line $T_{TAN-R}$. Each of the left and right tire chords $T_{C1}$, $T_{C3}$ may be spaced apart about one-fourth (¼) of the tire diameter $T_D$ from the central chord $T_{C2}$. The above spacing referenced from the tire diameter $T_D$ are exemplary and should not be meant to limit the scope of the exemplary pneumatic tire pre-conditioning systems and methods to approximately a one-fourth (¼) ratio; accordingly, other ratios may be defined, as desired.

Further, as will be described in the following disclosure, the tire, T, may be moved relative to structure. Referring to FIG. 1C, the movement may be referenced by an arrow U to indicate upwardly movement or an arrow D to indicate downwardly movement. Further, the movement may be referenced by an arrow L to indicate left or rearwardly movement or an arrow R to indicate right or forwardly movement.

Figure 2:
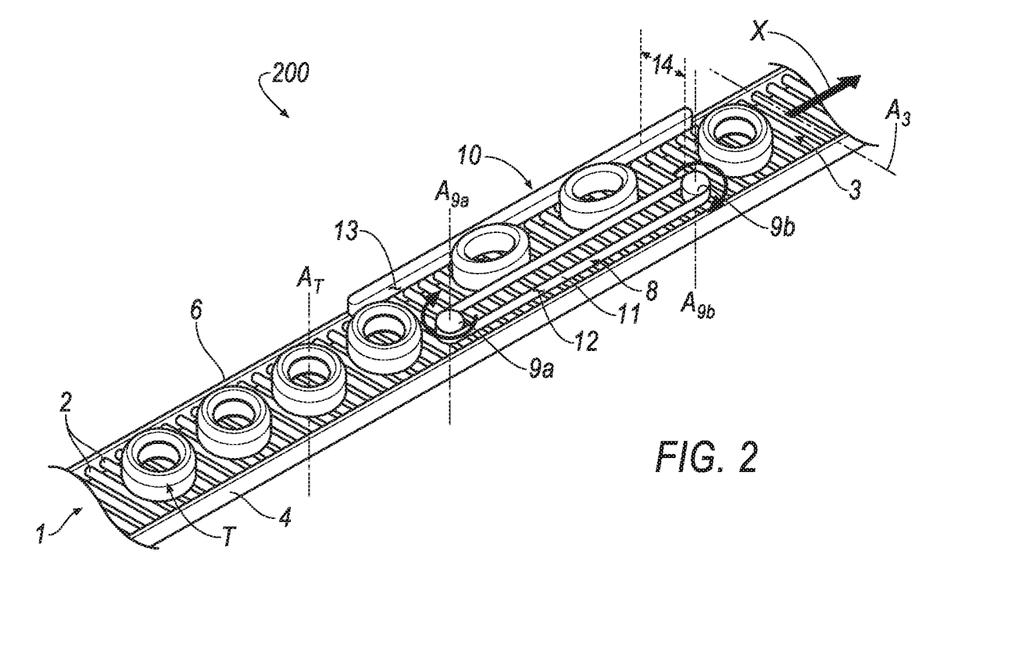
FIG. 2 is a perspective view of an exemplary pneumatic tire pre-conditioning system in accordance with the principles of the present disclosure.

Now referring to FIG. 2, a pneumatic tire pre-conditioning system 200 is depicted. The pneumatic tire pre-conditioning system 200 includes a typical conveyor system 1, a belt assembly 8 and a friction device 10. In some examples, the conveyor system 1 comprises a plurality of rollers 3 and a tire engaging surface 2 having a first side 4 and a second side 6. For example, each roller 3 may extend from the first side 4 to the second side 6 and define a portion of the tire engaging surface 2. Each roller 3 may define a longitudinal axis $A_3$ about which the roller 3 rotates. In some implementations, one or more of the rollers 3 may be powered by a motor, for example, to rotate about the longitudinal axis $A_3$ of such roller 3 for conveying an item (e.g., the tire T) in a direction X along the surface 2.

In some configurations, in lieu of a plurality of rollers 3, the conveyor system 1 may include a continuous loop of a carrying medium, such as a belt (not depicted). The belt may be made of a flexible material. Moreover, the conveyor system 1 may include two or more pulleys (not depicted) on which the belt rotates. The pulleys may be powered in order to rotate the belt about an axis (e.g., axis $A_3$) and move an item (e.g., the tire T) on the belt in the direction X along the surface 2.

Referring again to FIG. 2, the belt assembly 8 may be adjacent to one of the first side 4 or the second side 6 of the tire engaging surface 2, and the friction device 10 may be adjacent to the other of the first side 4 or the second side 6 of the tire engaging surface 2. In some implementations, the belt assembly 8 includes a first rotation device 9a adjacent a first end of the assembly 8, a second rotation device 9b adjacent a second end of the assembly 8, and a belt 11. In other implementations, the belt assembly 8 includes a plurality of rollers (not shown) in lieu of the belt 11.

The first and second rotation devices 9a, 9b may each define a cylindrical shape having first and second longitudinal axes $A_{9a}$, $A_{9b}$, respectively. As illustrated, in some implementations, the first and second longitudinal axes $A_{9a}$, $A_{9b}$ extend in a direction substantially perpendicular to the longitudinal axis $A_3$ and the direction X. The first and second rotation devices 9a, 9b may be rotatable about the first and second longitudinal axes $A_{9a}$, $A_{9b}$. In some implementations, the first and second rotation devices 9a, 9b may be freely-rotatable about the first and second longitudinal axes $A_{9a}$, $A_{9b}$, respectively. In other implementations, the first or second rotation device 9a, 9b may be powered by a motor, for example, to rotate about the axes $A_{9a}$, $A_{9b}$, respectively.

In some implementations, the belt 11 includes a continuous loop of material coupled to the first and second rotation devices 9a, 9b and having a first tire-engaging surface 12. For example, the belt 11 may at least partially surround both the first rotation device 9a and the second rotation device 9b, such that rotation of the first or second rotation device rotates the belt 11 about the axes $A_{9a}$, $A_{9b}$. In this regard, powered rotation (e.g., by a motor) of the first rotating device 9a or the second rotating device 9b about the axes $A_{9a}$, $A_{9b}$, respectively, may cause the belt 11 to rotate about the axes $A_{9a}$, $A_{9b}$. Conversely, rotation of the belt 11 about the axes $A_{9a}$, $A_{9b}$ may cause the first or second rotation devices 9a, 9b to rotate about the axes $A_{9a}$, $A_{9b}$, respectively.

The friction device 10 may include a second tire-engaging surface 13. As illustrated in FIG. 2, friction device 10 may be disposed within the conveyor system 1 such that the second tire-engaging surface 13 faces the first tire-engaging surface 12 of the belt 11. In particular, the second tire-engaging surface 13 may be substantially parallel to at least a portion of the first tire-engaging surface 12. In some implantations, the friction device 10, including the tire-engaging surface 13, is stationary relative to the surface 2. The second tire-engaging surface 13 may include a friction-enhancing material, such as emery paper, metal (e.g., steel, aluminum, etc.), rubber, polyoxymethylene (e.g., DELRIN, ultra-high-molecular-weight polyethylene, or a chain formed from one or more of the foregoing materials, for example. In particular, the second tire-engaging surface 13 may define a coefficient of friction that is greater than a coefficient of friction defined by the first tire-engaging surface 12. In this regard, as will be described in more detail below, engagement of the friction device 10 (e.g., the second tire-engaging surface 13) and the belt 11 (e.g., the first tire-engaging surface 12) with the tire T during conveyance of the tire T in the direction X may cause the tire T to at least partially rotate about a rotational axis $A_T$ thereof during movement of the tire T in the direction X.

Referring still to FIG. 2, during operation of the system 1, one or more of the rotation devices 9a, 9b may rotate the belt 11 about the axes $A_{9a}$, $A_{9b}$. As the belt 11 rotates or moves relative to the friction device 10, the tire T may move along the plurality of rollers 3 in the direction X in a path between the belt assembly 8 and the friction device 10. A distance 14 between the belt assembly 8 and the friction device 10 may be less than the outer diameter $T_D$ of the tire T, such that a geometry (e.g., shape) of the tire T is manipulated (e.g., changed) from an approximate circular shape to an approximate elliptical (e.g., oval) shape. In particular, engagement of the tire with the first and second tire-engaging surfaces 12, 13 may produce a shear force therebetween to compress the tire T and change the shape defined by the outer diameter $T_D$ from a circle to an ellipse. In some implementations, engagement of the tire T with the first and second tire-engaging surfaces 12, 13 may compress the tire T and change the shape defined by the outer diameter $T_D$ such that a ratio of the major outer diameter $T_D$ to the minor outer diameter $T_D$ between 1.25 and 3. The belt assembly 8 and the friction device 10 work in conjunction to distort, or otherwise change, the shape of the tire T.

After the tire T travels past and clears the belt assembly 8 and the friction device 10, the geometry of the tire T can return from the manipulated approximate elliptical shape to its original approximate circle shape. This method of manipulation can cause certain micro adhesions within the tire bead (e.g., the upper bead $T_{BU}$ or the lower bead $T_{BL}$), tread $T_T$, and carcass to be broken free. This elimination of the certain micro adhesions can improve the uniformity of, and throughout, the tire T. A more uniform tire T will have better performance, such as better sealing when mounted to a wheel and may produce fewer objectionable vibrations during operation of a vehicle on which the tire T is mounted.

Figure 3:
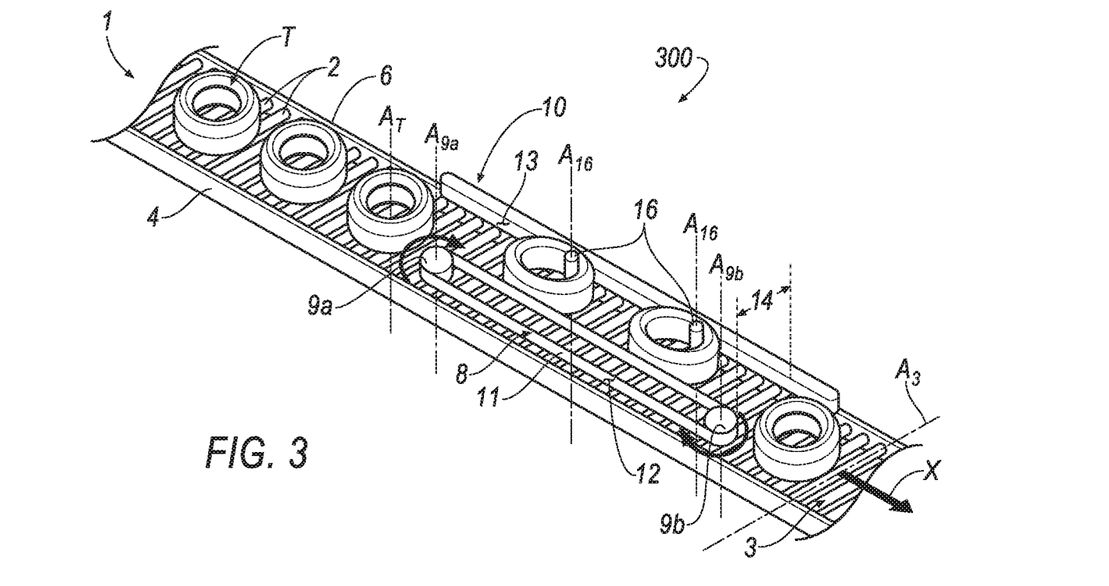
FIG. 3 is a perspective view of another exemplary pneumatic tire pre-conditioning system in accordance with the principles of the present disclosure.

Referring now to FIG. 3, another exemplary pneumatic tire pre-conditioning system 300 is shown, which generally includes the aspects, features and preferences of the pneumatic tire pre-conditioning system 200 shown in FIG. 2, except as discussed hereafter. As shown, the system 300 may include at least one pin 16 extending in a direction transverse to the surface 2 and disposed between the belt assembly 8 and the friction device 10. In some implementations, each pin 16 defines a cylindrical shape having a longitudinal axis $A_{16}$ extending in a direction substantially perpendicular to the longitudinal axis $A_3$ and the direction X. As will be described in more detail below, each pin 16 may further be translatable along, or rotatable about, its longitudinal axis $A_{16}$.

During operation of the system 300, the pin 16 may move a tire T, or move with the tire T, in the direction X along the tire engaging surface 2 in the path between the belt assembly 8 and the friction device 10. In some examples, the pin 16 may translate along its axis $A_{16}$ (e.g., rise) into the passage $T_P$ of the tire T through either the upper tire opening $T_{OU}$ or the lower tire opening $T_{OL}$. Upon translating into the passage $T_P$, the height of the pin 16 relative to the surface 2 may be greater than the height $T_H$ of the tire T.

During translation of the tire T in the direction X along the tire engaging surface 2, the pin 16 may engage an inner diameter (e.g., diameter $T_{P-D}$) of the tire T. For example, as the tire T translates in the direction X, the pin 16 may engage the upper bead $T_{BU}$ or the lower bead $T_{BL}$. In particular, the pin 16 may engage, and apply a force on, the upper and lower beads $T_{BU}$, $T_{BL}$ to pull the tire T in the direction X between the belt assembly 8 and the friction device 10. In this regard, during operation of the system 300, motion of the tire T about its axis $A_T$ and in the direction X between the belt assembly 8 and the friction device 8 may be imparted by pulling the tire T with the free-spinning pin 16, rather than moving the belt 11 relative to the friction device 10.

As the pin 16 pulls the tire T in the direction X, the belt assembly 8 (e.g., the first tire-engaging surface 12), the friction device 10 (e.g., the second tire-engaging surface 13) and the pin 16 may work together to rotate and distort the tire T as previously described. For example, in some implementations, as the pin 16 applies a force in the direction X on the tire T to pull the tire T between the belt assembly 8 and the friction device 10, the pin 16 may freely rotate about its axis $A_{16}$ on the upper or lower beads $T_{BU}$, $T_{BL}$ while the tire T rotates about its axis $A_T$ during engagement with the belt assembly 8 and the friction device 10. In other implementations, one or more of the rotation devices 9a, 9b or the pin 16 may be driven by a motor, for example, to rotate about their respective axes $A_{9a}$, $A_{9b}$, $A_{16}$ as the tire T moves between the belt assembly 8 and the friction device 10, such that the tire T rotates about its axis $A_T$ during translation in the direction X.

Figure 4:
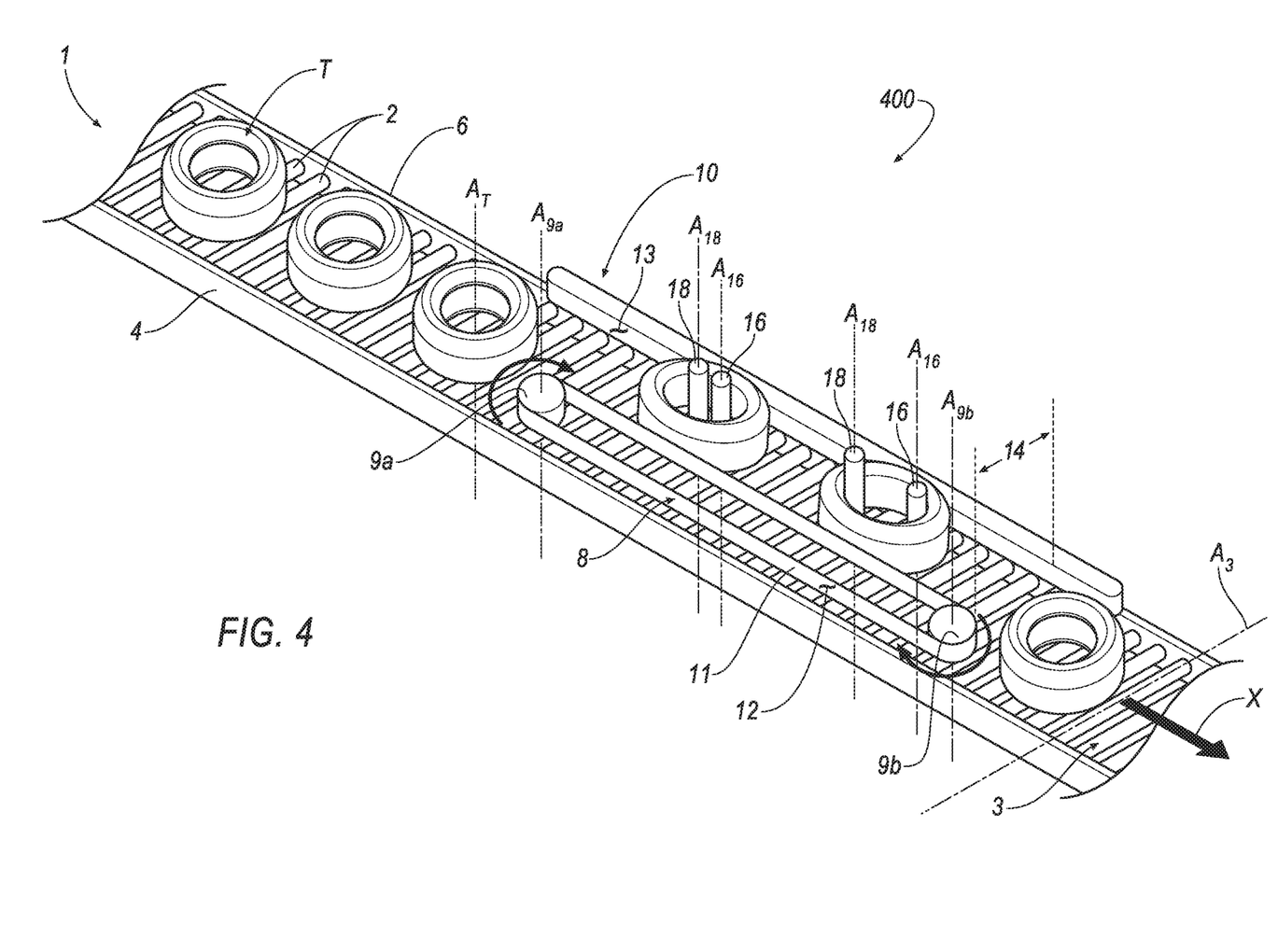
FIG. 4 is a perspective view of another exemplary pneumatic tire pre-conditioning system in accordance with the principles of the present disclosure.

Referring now to FIG. 4, another exemplary pneumatic tire pre-conditioning system 400 is shown, which generally includes the aspects, features and preferences of the pneumatic tire pre-conditioning systems 200 or 300 shown in FIGS. 2 and 3, respectively, except as discussed hereafter. As shown, the system 400 may include one or more of the pins 16 and one or more pins 18. As will be described in more detail below, during operation of the system 400, a pair of pins 16, 18 may pull the tire T into its manipulated approximate elliptical shape.

Each pin 18 may extend in a direction transverse to the surface 2 and be disposed between the belt assembly 8 and the friction device 10. In some implementations, each pin 18 defines a cylindrical shape having a longitudinal axis $A_{18}$ extending in a direction substantially perpendicular to the longitudinal axis $A_3$ and the direction X. As will be described in more detail below, each pin 18 may further be translatable along, or rotatable about, its longitudinal axis $A_{18}$.

During operation of the system 400, the pin 16 may move a tire T, or move with the tire T, in the direction X along the tire engaging surface 2 in the path between the belt assembly 8 and the friction device 10. In some examples, the pin 18 may translate along its axis $A_{18}$ (e.g., rise) into the passage $T_P$ of the tire T through either the upper tire opening $T_{OU}$ or the lower tire opening $T_{OL}$. Upon translating into the passage $T_P$, the height of the pin 18 relative to the surface 2 may be greater than the height $T_H$ of the tire T. After translating into the passage $T_P$, the pins 16, 18 may separate from one another. For example, the pin 16 may translate relative to the pin 18, or vice versa, such that the distance between the pins 16, 18 increases until the pins 16, 18 engage opposed location on the inner diameter (e.g., diameter $T_{P-D}$) of the tire T. For example, as the tire T translates in the direction X, the pins 16, 18 may engage opposite locations on the upper bead $T_{BU}$ and the lower bead $T_{BL}$. In particular, the pins 16, 18 may engage, and apply opposite forces on, the upper and lower beads $T_{BU}$, $T_{BL}$ to distort the geometry of the tire T in the manner previously described.

As the pins 16, 18 pull the tire T in opposite directions, the tire T may translate in the direction X between the belt assembly 8 (e.g., the first tire-engaging surface 12) and the friction device 10 (e.g., the second tire-engaging surface 13), such that the belt assembly 8, the friction device 10, and the pins 16, 18 work together to remove micro adhesions within the tire bead (e.g., the upper bead $T_{BU}$ or the lower bead $T_{BL}$), tread $T_T$, and carcass, as previously described.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A pneumatic tire pre-conditioning system, comprising:
   a conveyor system including a tire engaging surface, said conveyor system having a first side and a second side;
   a belt assembly adjacent to the first side of the tire engaging surface;
   a friction device adjacent to the second side of the tire engaging surface; and
   a drive system configured to move a tire along the tire engaging surface in a path between the belt assembly and the friction device,
   wherein a distance between the belt assembly and the friction device is less than an outer diameter of the tire.

2. The pneumatic tire pre-conditioning system of claim 1, wherein the conveyor system further includes a continuous loop of a carrying medium.

3. The pneumatic tire pre-conditioning system of claim 1, wherein the conveyor system further includes a plurality of rollers.

4. The pneumatic tire pre-conditioning system of claim 1, wherein the belt assembly includes a first end, a second end, a first rotating device adjacent the first end, a second rotating device adjacent the second end and a belt configured to engage and at least partially surround both the first rotating device and the second rotating device.

5. The pneumatic tire pre-conditioning system of claim 4, wherein the belt forms a continuous loop of a flexible material.

6. The pneumatic tire pre-conditioning system of claim 5, wherein the belt rotates around the first rotating device and the second rotating device.

7. The pneumatic tire pre-conditioning system of claim 1, wherein the belt assembly is unpowered.

8. The pneumatic tire pre-conditioning system of claim 1, wherein the friction device is stationary.

9. The pneumatic tire pre-conditioning system of claim 1, wherein the drive system includes a pin moving in synchronization with the conveyor system.

10. The pneumatic tire pre-conditioning system of claim 9, wherein the pin is configured to engage an inner diameter of the tire.

11. A pneumatic tire pre-conditioning method, comprising:
compressing a tire between first and second surfaces such that the tire is deformed into a deflected shape;
moving the first surface, the second surface, or the tire in a way that causes the tire to at least partially rotate about a rotational axis; and
while the tire at least partially rotates about the rotational axis, translating the tire and the rotational axis between the first surface and the second surface in a direction that is perpendicular to the rotational axis.

12. The method of claim 11, wherein the first surface, the second surface, or the tire is moved while the tire is at least partially deformed.

13. The method of claim 11, further including the step of presenting the tire to the first and second surfaces by way of a conveyor.

14. The method of claim 11, further including moving at least one of the first or second surfaces in a plane that is parallel to the rotational axis of the tire.

15. A method of operating a pneumatic tire pre-conditioning system, comprising:
providing a conveyor system including a tire engaging surface having a first side and a second side;
providing a belt assembly adjacent to the first side of the tire engaging surface;
providing a friction device adjacent to the second side of the tire engaging surface; and
moving a tire along the tire engaging surface in a path between the belt assembly and the friction device, wherein a distance between the belt assembly and the friction device is less than an outer diameter of the tire.

16. The method of claim 15, wherein the conveyor system further includes a continuous loop of a carrying medium.

17. The method of claim 15, wherein the conveyor system further includes a plurality of rollers.

18. The method of claim 15, wherein the belt assembly includes a first end, a second end, a first rotating device adjacent the first end, a second rotating device adjacent the second end and a belt configured to engage and at least partially surround both the first rotating device and the second rotating device.

19. The method of claim 18, wherein the belt rotates around the first rotating device and the second rotating device.

20. The method of claim 15, wherein the belt assembly is unpowered.

21. The method of claim 15, wherein the friction device is stationary.

* * * * *